(12) United States Patent
Bhagwan et al.

(10) Patent No.: US 11,263,664 B2
(45) Date of Patent: Mar. 1, 2022

(54) COMPUTERIZED SYSTEM AND METHOD FOR AUGMENTING SEARCH TERMS FOR INCREASED EFFICIENCY AND EFFECTIVENESS IN IDENTIFYING CONTENT

(71) Applicant: VERIZON MEDIA INC., New York, NY (US)

(72) Inventors: Varun Bhagwan, Los Gatos, CA (US); Blake Carpenter, San Francisco, CA (US); Mihajlo Grbovic, Mountain View, CA (US); Doug Sharp, San Francisco, CA (US); Vladan Radosavljevic, Sunnyvale, CA (US); Nemanja Djuric, Mountain View, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 354 days.

(21) Appl. No.: 14/984,300

(22) Filed: Dec. 30, 2015

(65) Prior Publication Data

US 2017/0193037 A1  Jul. 6, 2017

(51) Int. Cl.
*G06Q 30/00* (2012.01)
*G06Q 30/02* (2012.01)

(52) U.S. Cl.
CPC .............................. *G06Q 30/0256* (2013.01)

(58) Field of Classification Search
CPC combination set(s) only.
See application file for complete search history.

(56) References Cited

U.S. PATENT DOCUMENTS

| 8,386,509 B1* | 2/2013 | Scofield | G06F 16/9535 |
| | | | 707/769 |
| 2002/0156817 A1* | 10/2002 | Lemus | G06F 16/353 |
| | | | 715/256 |
| 2007/0088687 A1* | 4/2007 | Bromm | G06F 17/30663 |
| 2009/0216696 A1* | 8/2009 | Downs | G06F 17/30675 |
| | | | 706/20 |
| 2014/0279584 A1* | 9/2014 | Lee | G06F 3/0481 |
| | | | 705/310 |

(Continued)

*Primary Examiner* — Kambiz Abdi
*Assistant Examiner* — Christopher Stroud
(74) *Attorney, Agent, or Firm* — James J. De Carlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods transform user search keywords into equivalent keyword formats commonly used and/or found within messaging platforms, and compile a data set from such information from which a search for content can be based. The present disclosure, therefore, provides systems and methods that augment users' search terms with terms found in users' mailboxes for purposes of searching for, identifying and communicating content that is relevant to those users.

21 Claims, 7 Drawing Sheets

(56) References Cited

U.S. PATENT DOCUMENTS

2014/0317142 A1* 10/2014 Naidu ............... G06F 17/30542
 707/780
2017/0085509 A1* 3/2017 Fernandez ............. H04L 51/12
2017/0103110 A1* 4/2017 Winstanley ....... G06F 17/30542

* cited by examiner

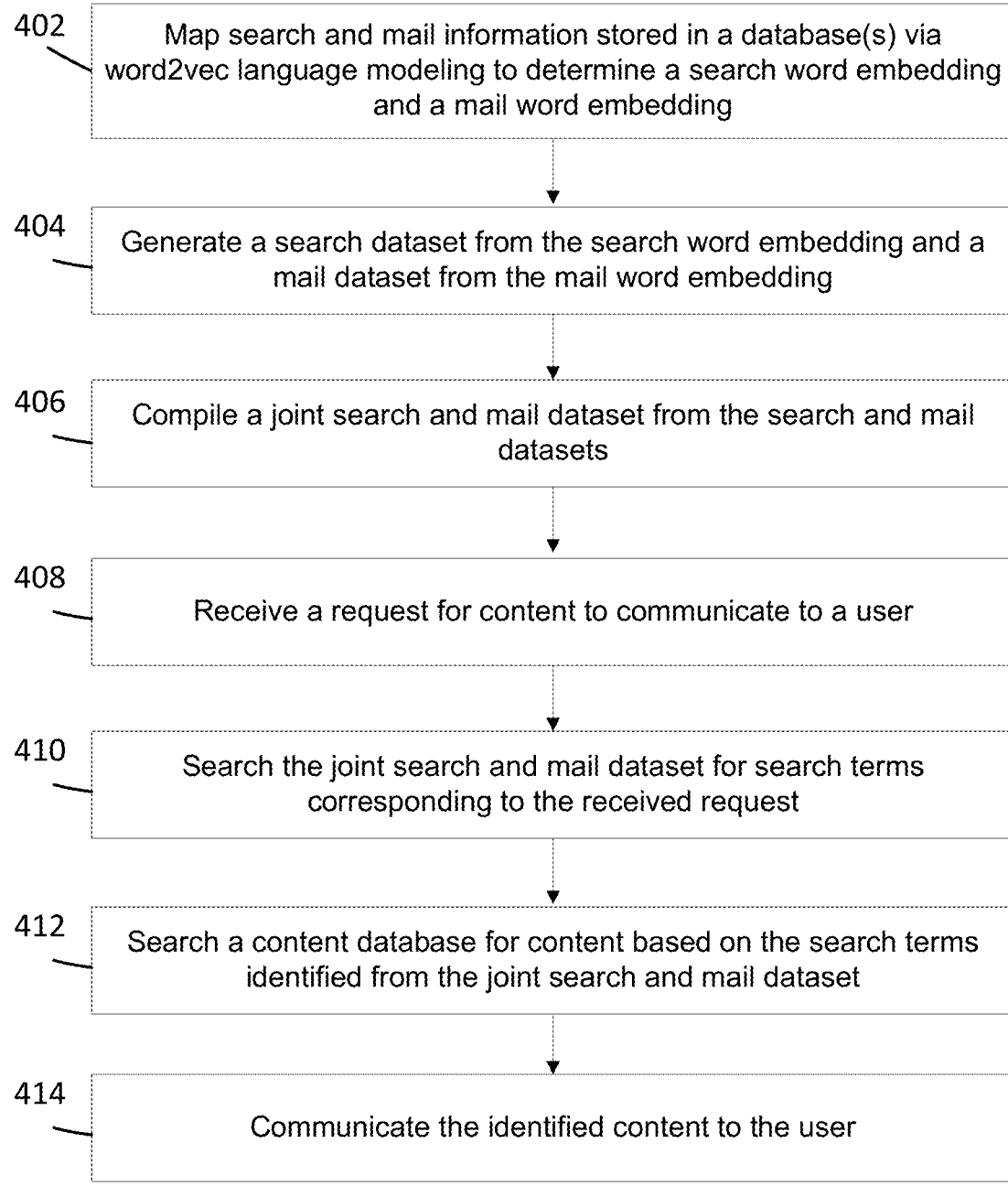
FIG. 4A     400

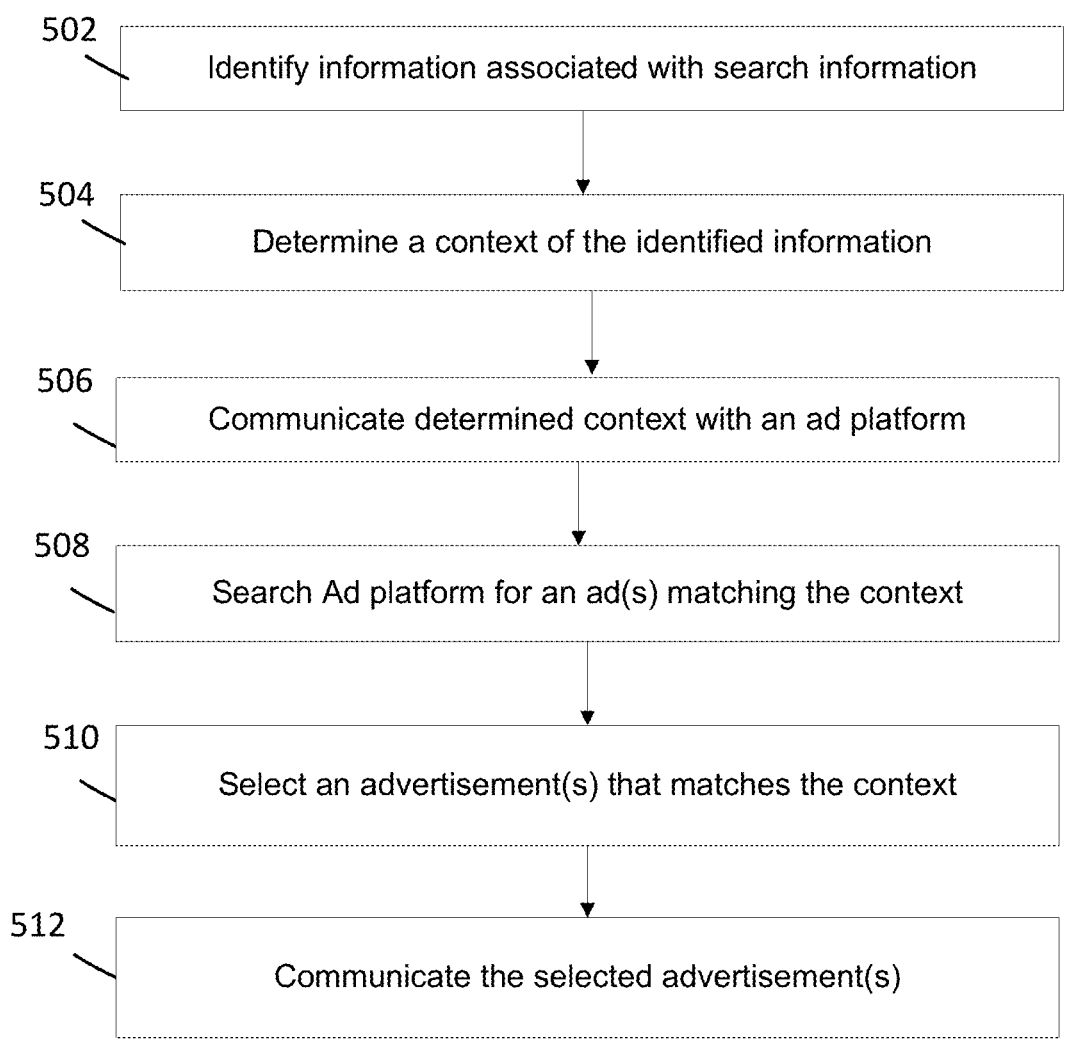

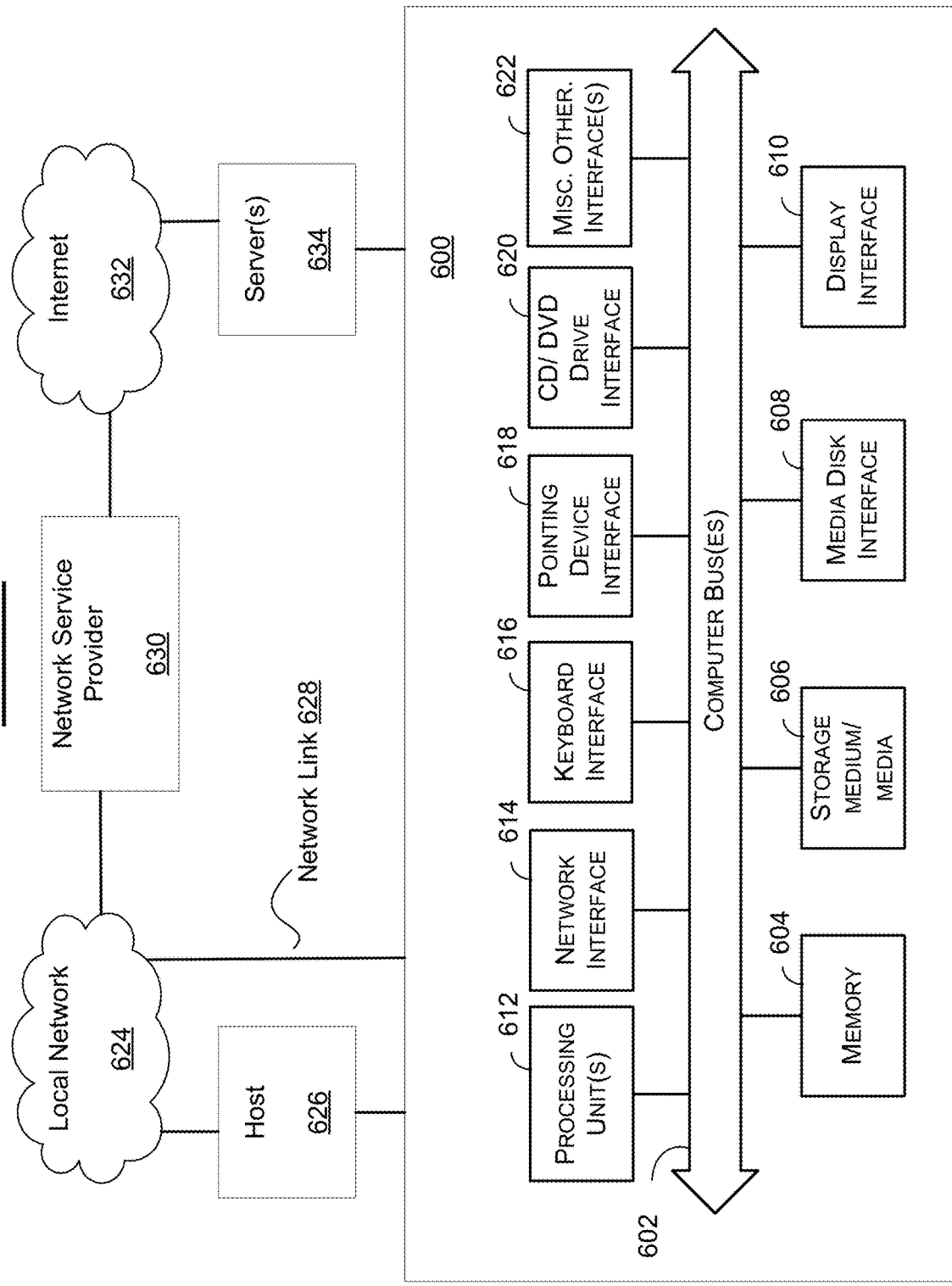

COMPUTERIZED SYSTEM AND METHOD FOR AUGMENTING SEARCH TERMS FOR INCREASED EFFICIENCY AND EFFECTIVENESS IN IDENTIFYING CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing, recommending and/or hosting computer systems and/or platforms by modifying the capabilities and providing non-native functionality to such systems and/or platforms for automatically augmenting search terms for increased efficiency and effectiveness in searching for and identifying content to provide a user.

SUMMARY

The present disclosure provides novel systems and methods for leveraging information associated with both users' search activity and messaging activity in order to identify content to provide to those users. Present systems generally utilize information concerning a user's past searches to assist with the formulation of search queries. According to some embodiments herein, the disclosed systems and methods improve the field of electronic search by providing a computerized technique for increasing the relevance and quality of digital content communicated to users by utilizing a combination of Search Retargeting (SRT) information associated with users' recent searches (e.g., keywords users entered as search queries) and keywords identifiable from users' email activity (e.g., text from sent and received emails).

According to some embodiments of the instant disclosure, the disclosed systems and methods transform search keywords into equivalent keyword formats commonly used and/or found within messaging platforms (e.g., email mailboxes of users). This information is then compiled into a generated data set which includes information associated with how the search keywords and mail keywords are related. The compiled data set enables the search information used to provide content to search and SRT audiences, as with conventional content providing systems, to be augmented with information from messaging platforms.

Thus, according to some embodiments, the disclosed systems and methods enable digital content to be identified (or selected) based on the augmented search terms (or the composite search and mail term dataset). Such digital content can be identified from a broader range of content than from conventional content providing systems, in that not only are search terms being used to identify content, but mail terms are being utilized, thereby effectuating more a more robust search resulting in more relevant and higher quality content being identified and provided to users receiving digital content communications. This directly improves not only search technology but associated technologies such as for example search advertising, e-commerce and messaging, to name a few.

It will be recognized from the disclosure herein that embodiments of the instant disclosure provide improvements to a number of technology areas, for example those related to systems and processes that handle or process content recommendations, such as but not limited to, search engines, local and/or web-based applications, e-mail or other types of media rendering or recommendation platforms, electronic social networking platforms and the like. The disclosed systems and methods can leverage the increased size of data compiled from both the search and mail information in order to effectuate improved efficiency and relevancy to systems used to provide content to users. As evidenced from the discussion below, the disclosed systems and methods enable a more robust, accurate electronic network-based search for content to be performed by leveraging information about a users' search and mail information. As discussed in more detail below, this can lead to increased click-through rate (CTR) of provided media content (e.g., how many views, shares, reblogs, saves, downloads and the like) thereby increasing not only the virality of the provided content, but also the effectiveness (and value) of the content providing system in targeting interests of users.

In accordance with one or more embodiments, a method is disclosed for automatically augmenting search terms for increased efficiency and effectiveness in searching for and identifying content to provide a user.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically augmenting search terms for increased efficiency and effectiveness in searching for and identifying content to provide a user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4B are flowcharts illustrating steps performed in accordance with some embodiments of the present disclosure;

FIG. 5 is a flowchart illustrating steps performed in accordance with some embodiments of the present disclosure; and FIG. 6 is a block diagram illustrating the architecture of an exemplary hardware device in accordance with one or more embodiments of the present disclosure.

DESCRIPTION OF EMBODIMENTS

Figure 1:
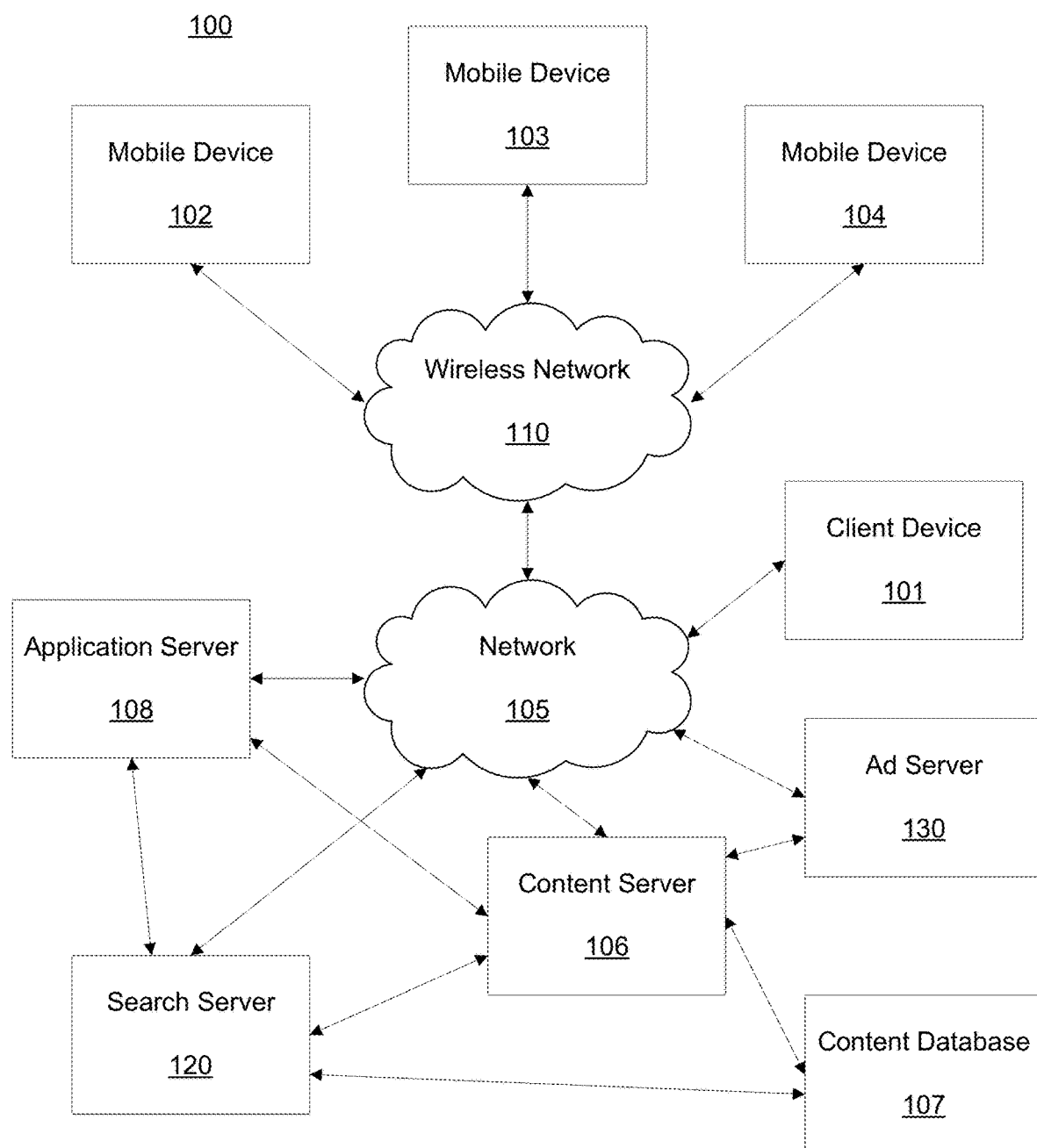
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The principles described herein may be embodied in many different forms. By way of background, search and SRT audiences are typically only served content based on information derived from user search activity, for example, a user's search terms or queries. Any attempt by conventional systems to incorporate additional information into the corpus of information forming a basis of serving search and SRT users with content has failed with respects to scalability, cost, efficiency and effectiveness. For example, conventional content providing systems typically employ a number of Natural Language Processing (NLP) applications, including, for example, information retrieval, part-of-speech tagging and chunking, which involve specific objectives that can be generalized to the task of assigning a probability value to a sequence of words. To this end, language models can define a mathematical model to capture statistical properties of words and the dependencies among them. Traditionally, language model approaches represent each word as a feature vector, where a word vector has the same length as the size of a vocabulary, and the position that corresponds to the observed word is equal to 1, and 0 otherwise. However, such approach exhibits significant limitations in practical tasks, suffering from high dimensionality of the problem and severe data sparsity, resulting in suboptimal performance.

The present disclosure addresses the shortcomings in the art by providing improved systems and methods that utilize low-dimensional, distributed embeddings of words from repositories of information associated with both user search activity and user messaging activity. According to some embodiments of the instant disclosure, the disclosed systems and methods transform search keywords into equivalent keyword formats commonly used and/or found within messaging platforms (e.g., email mailboxes of users). The transformed search keywords and mail keywords are compiled into a dataset that relays how the search keywords are related to the mail keywords, and vice-versa. According to some embodiments of the present disclosure, the compiled data set enables search terms that are utilized to identify content to serve a user to be augmented with equivalent or related mail terms when providing users with digital content over a network. The disclosed systems and methods thereby provide content providing systems and platforms the ability to increase relevancy and quality of content that is being provided to users by basing the discovery of such served content to be based on a more robust resource: both search terms and mail terms.

According to some embodiments, the disclosed systems and methods can employ neural language modeling in order to take advantage of the word order in text files, explicitly modeling the assumption that closer words in the word sequence are statistically more dependent. According to some embodiments, the disclosed systems and methods employ highly scalable word2vec analysis modeling, such as for example, continuous bag-of-words (CBOW) and/or skip-gram (SG) language models for learning word representations. It should be noted that while reference to these language models is used herein, it should not be construed as limiting as any known or to be known language model that is scalable to handle the millions of vocabulary words existing and/or to be existing in a language lexicon is applicable to the disclosed systems and methods without departing from the scope of the instant disclosure.

Through such language models, the disclosed systems and methods can accurately determine (e.g., capture) both syntactic and semantic relationships between words in large-scale text corpora, thereby obtaining state-of-the-art results on a plethora of NLP tasks. Indeed, as understood by those of skill in the art, in some embodiments, the disclosed modeling of distributed representations can be extended beyond word representations to sentences and paragraphs (e.g., using paragraph2vec or doc2vec analysis), relational entities, general text-based attributes, descriptive text of images, nodes in graph structure, and other applications. Therefore, while the discussion herein will focus on word modeling, additional and/or alternative embodiments exist within the scope of the instant disclosure without departing from the functionality of the disclosed systems and methods.

Therefore, the disclosed systems and methods can determine, retrieve, derive and/or otherwise identify terms from users search and mail activity (e.g., using the language modeling discussed above) in order to compile a novel dataset of terms that can be used to provide users relevant content. As mentioned above and discussed below in more detail, the identified search terms can be transformed (or converted) into a format corresponding to discovered mail terms which enables a uniformly formatted dataset of terms. This is based on an effective keyword-transformation, as opposed to in-domain keyword-expansion implemented by conventional systems. The disclosed keyword-transformation is implemented across heterogeneous datasets of search and mail information. The disclosed augmentation of search information with previously unused mail information provides content providing systems with an increased marketshare of information. That is, conventional systems provide content to users based solely on the users' search information, which evidences marginal results compared to the disclosed systems and methods implementations of a robust resource library of search and (previously unused and undiscoverable) mail terms.

For example, a conventional content providing system, using only search information compiled from users, results in only 400,593 click-throughs. Such low figures can be attributed to the fact that modern users typically spend under 5% of their online time using traditional search engines. However, implementing the disclosed systems and methods discussed herein, which augments the search information with mail information from users, the same content providing system evidences an increased number of click-throughs: 2,382,938. (Note: such numbers are based on Yahoo!® testing of existing systems compared against the disclosed systems and methods).

Thus, the disclosed systems and methods provide not only a highly scalable, efficient content searching and providing system, but the disclosed systems and methods also provide improved results, as evidenced from, for example, the increased number of click-throughs, which correspond to users being provided more accurate and relevant content.

As discussed in more detail below at least in relation to FIG. 5, according to some embodiments, information associated with or derived from analyzed information (search and/or mail information) and/or provided, selected and/or rendered media can be used for monetization purposes and targeted advertising when providing, delivering or enabling access to such media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo sharing site/service (e.g., Tumblr®), an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter®, and the like), search application (e.g., Yahoo!® Search), a mail or messaging application (e.g., Yahoo!® Mail, Yahoo!® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
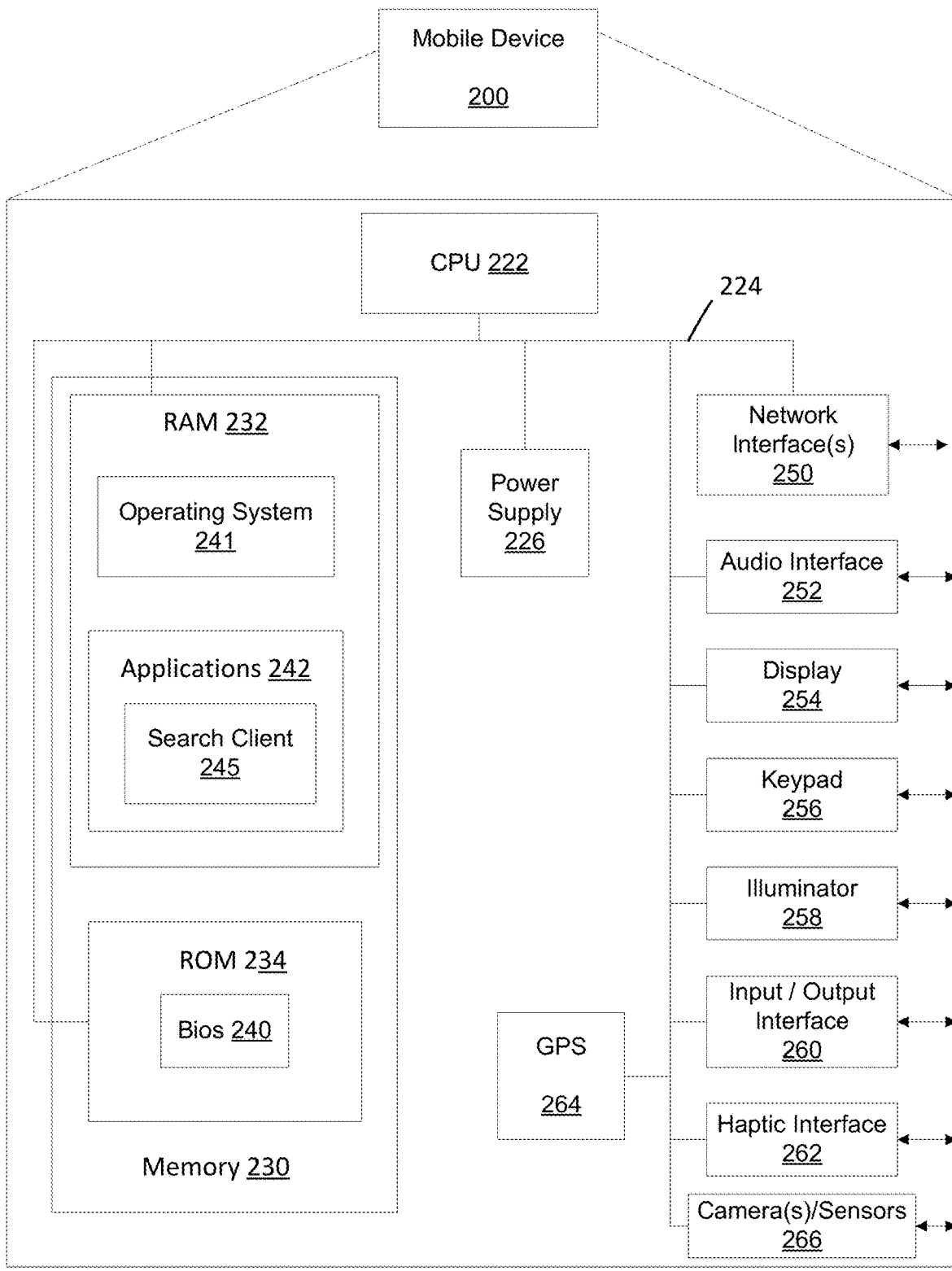
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
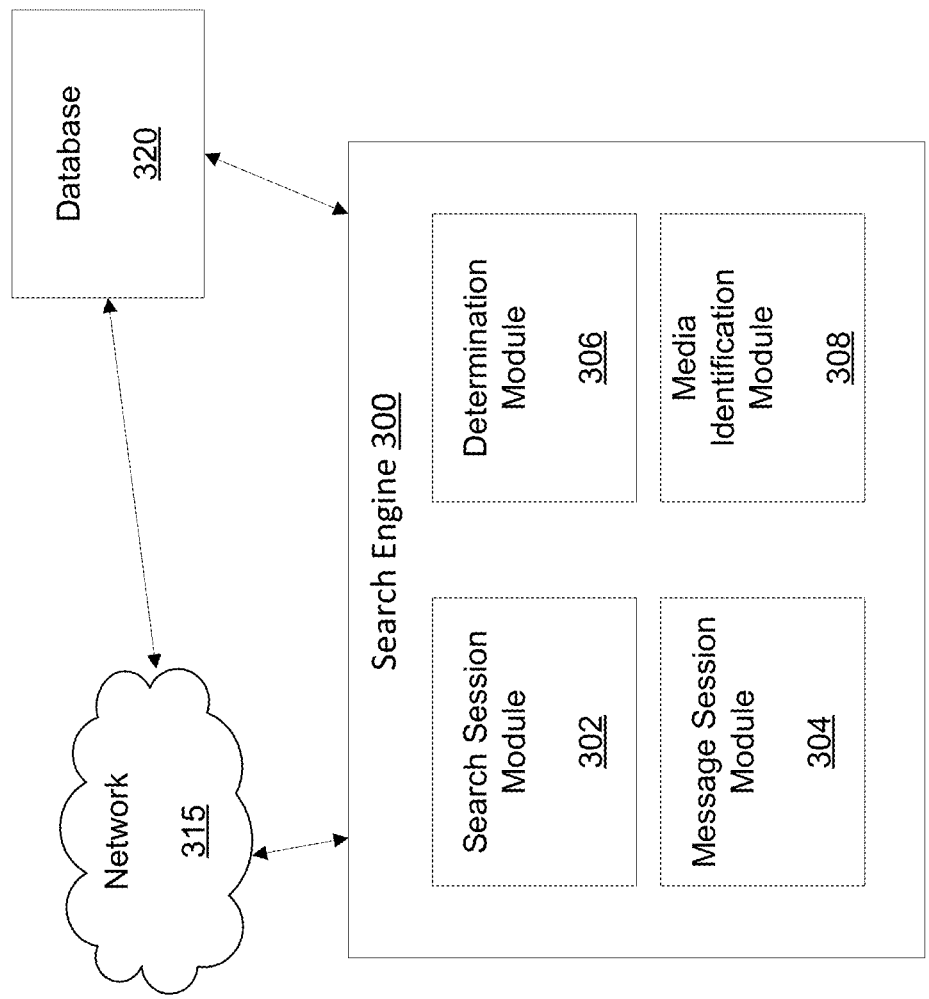
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a search engine 300, network 315 and database 320. The search engine 300 can be a special purpose machine or processor and could be hosted by an application server, content server, social networking server, web server, search server, content provider, email service provider, ad server, user's computing device, and the like, or any combination thereof.

According to some embodiments, search engine 300 can be embodied as a stand-alone application that executes on a user device. In some embodiments, the search engine 300 can function as an application installed on the user's device, and in some embodiments, such application can be a web-based application accessed by the user device over a network. In some embodiments, the search engine 300 can be installed as an augmenting script, program or application to another media and/or content serving application, such as, for example, Yahoo!® Search, Yahoo!® Mail, Flickr®, Tumblr®, Twitter®, Instagram®, SnapChat®, Facebook®, Amazon®, EBay® and the like.

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, such as for example, a user's search history, user attributes, user preferences or settings, user demographic information, user location information (i.e., past and present location(s) of the user, and future locations of the user (derived from a calendar or schedule of the user—e.g., planned activities), user biographic information, user messaging information, such as for example, information associated with a user's messaging activity (e.g., message content in the user's inbox, outbox, sent folder and the like) and the like, or some combination thereof. In some embodiments, the user data can also include, for purposes rendering and/or displaying content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for content, message (e.g., send or receive messages), upload, download, share, edit, comment or otherwise avail users to media content (e.g., Yahoo!® Search, Yahoo!® Mail, Flickr®, Tumblr®, Twitter®, Instagram®, SnapChat®, Facebook®, and the like). Such sites may also enable users to search for and purchase products or services based on information provided by those sites, such as, for example, Amazon®, EBay® and the like. In some embodiments, database 320 can comprise data and metadata associated with such content information from one and/or an assortment of media hosting sites.

In some embodiments, database 320 can comprise a lexicon of one or more words, by way of non-limiting example, a vocabulary, dictionary or catalogue of words/phrases (e.g., known or learned word combinations). As discussed below, the lexicon can be compiled based on the search and mail activity of users on a network. In some embodiments, the lexicon information housed within the database 320 can be arranged in accordance with various known or to be known models in order to preserve an efficient and accurate retrieval of terms within the database.

According to some embodiments, the lexicon in database 320 comprises terms (i.e., words, phrases or paragraphs) arranged according to how they were generated. For example, terms associated with search queries can be organized according to when they were entered by a user and/or which other search terms were associated therewith. Terms associated with mail message can be organized in accordance with other terms in the same or similar messages (e.g., group text within a single message, group text associated with a message thread). In some embodiments, the words are arranged according to known or to be known language models. The words in the lexicon can be assigned a unique identifier, such as, but not limited to, a number or value. It should be understood that generally no two words (or phrases) in a lexicon are associated with the same unique identifier. Thus, a unique identifier should be unique to one word/phrase in the lexicon.

According to some embodiments, n-grams may be encoded using such word identifiers. As understood by those of skill in the art, an n-gram involves computational linguistics for a contiguous sequence of n-items from a given sequence of text. Thus, in the lexicon within database 320, the terms that are related to one another (e.g., terms in a search query or terms in a mail message) can be arranged according to a language model utilized for identifying the next item in such a sequence. It should be understood that any known or to be known arrangement or model (e.g., Markov model) and/or algorithm can be used for arranging one or more words, and identifying such one or more words in the database 320.

In some embodiments, database 320 can be specific to a user or a global lexicon (such as a generic or learned/trained lexicon). Thus, in some embodiments, the lexicon of terms in database 320 may be ranked or ordered according to the number of times a user or users has used a term in a search query and/or mail message during a predetermined period. In some embodiments, the lexicon in database 320 can be based on a user's or users' behavior (e.g., past search query activity—for example, words or phrases used in performing a search at or above a threshold (frequency over a predetermined time) which takes precedence over global lexical norms and conventions). Therefore, in some embodiments, a determined frequency for which a user uses a word or phrase in a search or mail message may be utilized to organize how a lexicon stores or organizes words/phrases.

In some embodiments, the information stored in database 320 can be represented as an n-dimensional vector (or feature vector) for each search and/or message, where the information associated with the words (or text or keywords) within each search and/or message corresponds to a node(s) on the vector. Additionally, the information in database 320 can comprise, but is not limited to, social metrics associated with the information (e.g., popularity of the content or product—a number of views, shares, favorites, reviews or purchases), a title or comment(s) associated with the information, tags, descriptions, quality of the content, recency of the content's upload and/or share(s), and the like. Such factors can be derived from information provided by the user, a service provider (e.g., Yahoo!®), by the content/service providers providing content information (e.g., Tumblr®, Flickr®, or third party vendor sites), or by other third party services (e.g., Twitter®, Facebook®, Instagram®, and the like, or third party sites that enable users to purchase products from other vendors, such as Amazon®), or some combination thereof. In some embodiments, such additional factors can also be translated as nodes on the n-dimensional vector for a respective search query, search result and/or message.

As such, database 320 can store and index content information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of content information, as discussed above, the information can be analyzed, stored and indexed according to any known or to be known computational analysis technique or algorithm, such as, but not limited to, Word2Vec analysis, cluster analysis, data mining, Bayesian network analysis, Hidden Markov models, artificial neural network analysis, logical model and/or tree analysis, and the like.

Database 320 can be a single database housing information associated with such providers, and in some embodiments, database 320 can be configured as a linked set of data stores that provides such information, as each datastore in the set is associated with and/or unique to a specific service and/or content provider.

While the discussion herein will reference text, words or keywords from search queries and email messages in general, it should be understood that any type of known or to be known content can be used or derived from the search and mail information discussed herein, including, but not limited to, images, videos, graphics interchange formatted (GIF) videos, audio, and the like, without departing from the scope of the instant disclosure. Indeed, modern search queries can include any type of content item, as well as email messages.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the search engine 300, and the database of stored resources 320. Indeed, as illustrated in FIG. 3, the search engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as search engine 300, and includes search session module 302, message session module 304, determination module 306 and media identification module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIGS. 4A-4B.

Turning to FIG. 4A, Process 400 details steps performed in accordance with some embodiments of the present disclosure for communicating content to a user based the expanded marketplace of information that includes keywords (or terms, used interchangeably) identified from user search information and from user messaging activity.

For purposes of simplifying the disclosure herein, reference will be made to user messaging activity by referring to user email activity (e.g., emails on a mail platform such as Yahoo!® Mail). It should not be construed as limited to such embodiment as any type of known or to be known communication information communicated to and/or from a user(s) across any known or to be known platform can be utilized herein, such as, for example, messages communicated on social networking sites, Instant Messages (IMs), SMS, MMS, user comments on blogs, and the like.

Process 400 begins with Step 402 where user search information and user mail information stored in a database(s) are analyzed in order to map search and mail terms (or keywords) found in the database(s).

As discussed above, in some embodiments, the database(s) being analyzed can be a single database housing user search and mail information, and/or, in some embodiments, can be distributed databases: a search database and a mail database. For example, in some embodiments, a single database may be associated with a single provider providing search and mail services (e.g., Yahoo!® Search and Yahoo!® Mail). In an example of multiple (or distinct) databases for search and mail information, in some embodiments, the information may be associated with multiple providers (e.g., Google® Mail and Microsoft Bing® Search). For purposes of simplicity within this disclosure, the database being analyzed in Step 402 will be referenced as a single database, database 320 from FIG. 3, where, for example, database 320 comprises a vocabulary of terms associated with Yahoo!® Search and terms associated with Yahoo!® Mail; however, it should not be construed as limiting the disclosure herein to a single database embodiment, as discussed above.

According to some embodiments, Step 402 involves the implementation of a word2vec algorithm, or a similar modeling technique (as discussed above) to map the terms in the database. As understood by those of skill in the art, word2vec (and the like) modeling can result in "word embedding" which involves mapping words (and/or phrases, paragraphs and like) from a vocabulary (within a database) to vectors of real numbers in a low dimensional space, where the dimensional space is relative to the vocabulary size ("continuous space") of the database. Such word embedding via word2vec analysis/modeling (and the like in similar language and feature learning techniques) enables parsing, and sentiment and contextual analysis from the vocabulary, as discussed herein.

In some embodiments, Step 402 involves performing language modeling (in some embodiments via word2vec modeling) of the search terms in database 320 via the search session module 302 and modeling of the mail terms in database 320 via the message session module 304. In some embodiments, the search information in database 320 from which the search terms are identified via, for example, word2vec modeling, is determined (and stored) from user-generated searches and queries (i.e., search terms) users have used to search for content using a search engine. In some embodiments, the search information available to be mapped may be in accordance with a predetermined period of time, for example, only user searches for content occurring over the past 30 minutes, as discussed below.

According to some embodiments, Step 402's mapping of the search information (referred to "sessioning" via the search session module 302 implementing word2vec modeling on stored search information in database 320) involves transforming each search term query into a single word. For example, the search query "where to go for pizza" is transformed into "where_to_go_for_pizza". In some embodiments, Step 402's sessioning of search terms/queries accounts for a predetermined period of time such that a sequence of searches performed by a single user will only be mapped when they are performed within the predetermined period of time (e.g., within 30 minutes from the above example). In some embodiments, in addition to or alternative to the above embodiments, Step 402's sessioning of search terms/queries can account for a sequence of searches up to when a period of time of inactivity is determined. The reasoning behind such time periods for mapping sequential searches is that consecutive searches are typically contextually related. For example, a user may search for "cats", "cat toys", "where to buy catnip" and "pet stores" typically within a sequence of search queries over a short period of time (e.g., during a single search session).

In some embodiments, the mail information in database 320 from which the mail terms are identified (via, for example, word2vec modeling) is determined (and stored) from messages users (e.g., of Yahoo!® Mail) have sent and received using an email platform (i.e., messages in users' inboxes and outboxes). In some embodiments, the mail information may be determined according to a predetermined period of time, such as for example, daily, such that the mail information available for mapping is derived from a daily Mail-On-Grid (MoG) daily feed of stored mail data.

According to some embodiments, Step 402's mapping of the mail information (i.e., sessioning via the message session module 304 implementing word2vec modeling on stored mail information in database 320) involves accounting for individual mail messages as single sessions. According to some embodiments, raw email data associated with an email(s) is normalized by the message session module 304 to determine (or identify) only letters, spaces and underscored characters from email text. For example, the words "pumpkin pie" that are present within the text of an email are translated into the term "pumpkin_pie". In some embodiments, any HyperText Markup Language (HTML) markups and stopwords can be removed, and any identifiable n-grams can be modified in order to be treated as individual words.

In Step 404, the mapping of the terms in the database in Step 402 results in the construction (generation, determination or identification) of two datasets: a search dataset $D_s$ and a mail dataset $D_m$. The constructed datasets are generated, compiled, identified or otherwise created by the search session module 302 (for the search dataset $D_s$) and the message session module 304 (for the mail dataset $D_m$). As discussed above, the constructed datasets can be compiled according to any organization or structural technique or implementation discussed above in relation to the storage structures of database 320.

According to some embodiments, search dataset $D_s$ includes the determined search word embeddings associated with S search sessions of online users. As discussed above, the set of search sessions are defined as uninterrupted sequences of web search activity. In some embodiments, as discussed above, search dataset $D_s$ can be based on Step 402's mapping (or "sessionizing") log data from user searches (from database 320) into sessions $s_i$, which can be represented as a set of $N_s$ queries q of ordered in time:

$$s_i = (q_1, q_2, \ldots, q_{N_s}) \in \mathcal{S}, \qquad (1).$$

According to some embodiments, the mail dataset $D_m$ includes a set of determined word embeddings from M e-mails that have been communicated (e.g., sent and/or received and stored in database 320). As discussed above, the mail dataset $D_m$ can be based on Step 402's mapping (or "sessionizing") user mail log data from users' mailboxes:

$$m=(e_1, \ldots, e_{N_m}) \in \mathcal{M}, \quad (2)$$

which is defined by a set of $N_m$ emails m, and each email $e_m = (k_{m1}; k_{m2}, \ldots k_{mTm})$ consists of Tm mail n-grams associated with k keywords (or terms or mail word embeddings) determined from Step 402.

In Step 406, a joint search and mail dataset is compiled from the search dataset $D_s$ and the mail dataset $D_m$. The compilation of a joint dataset in Step 406 is detailed in FIG. 4B. Step 406 (as well as Steps 450-456 of FIG. 5) is performed by the determination module 306.

The process occurring in Step 406 begins with Step 450 where the search dataset $D_s$ and the mail dataset $D_m$ are merged into a joint dataset, $D_{s2m}$. The merger occurring in Step 450 (and Step 406) can be performed by any known or to be known merger or sorting algorithm, including, but not limited to, a shuffle algorithm, parallel algorithm, k-way merge algorithm, and the like.

In Step 452, the terms from the search dataset $D_s$ and the mail dataset $D_m$ are analyzed to determine the source of the keywords k (or terms) in the joint dataset. According to some embodiments, the analysis performed to determine the presence or identification of keywords in each dataset can involve any known or to be known technique, algorithm or mechanism for determining and distinguishing the identification of a keyword. For example, such computerized techniques, algorithms or mechanisms can include, but are not limited to, word2vec analysis (as discussed above), feature vector analysis, cluster analysis, data mining, Bayesian network analysis, Hidden Markov models, artificial neural network analysis, logical model and/or tree analysis, and the like.

As a result of Step 452, the keywords from the datasets will be tagged, identified or augmented with a prefix (or modified to include data or metadata) that indicates whether the keyword in one dataset appears in the other dataset. According to some embodiments, keywords that appear in the search dataset $D_s$ and the mail dataset $D_m$ will receive a prefix: "b_"; keywords that appear in the search dataset $D_s$ but not the mail dataset $D_m$ will receive a prefix: "s_"; and keywords that appear in the mail dataset $D_m$ but not the search dataset $D_s$ will receive the prefix: "m_".

Figure 4B:
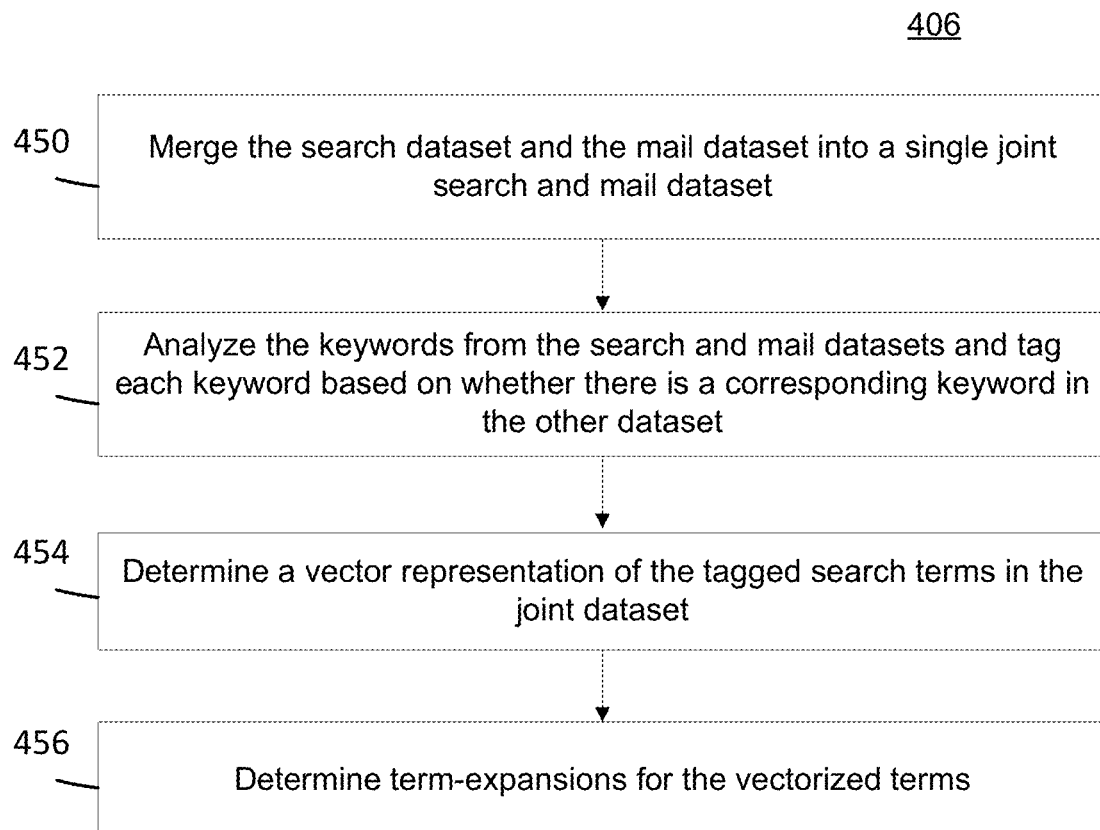

By way of a non-limiting example, illustrating the above steps from FIGS. 4A-4B, a search query included the words: "pumpkin pie" and an email included the words "pumpkin pie" as well. Using the word2vec analysis discussed above, these terms are converted into a single keyword each: "pumpkin_pie". Since they appear in each dataset, the prefix "b_" will be applied to the keyword: "b_pumpkin_pie" within the joint dataset $D_{s2m}$, which indicates that the term is sourced from the search dataset $D_s$ and the mail dataset $D_m$.

In Step 454, the tagged keywords in the joint dataset $D_{s2m}$ are subject to vector analysis in order to determine vector representations of each tagged keyword. As discussed above, while the discussion of some embodiments involves vector analysis of the keywords, the keyword information can be analyzed, stored, indexed, parsed and the like according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

According to some embodiments, the vectorization occurring in Step 454 can be based on an application of the skip-gram (SG) modeling technique to the keywords in the joint dataset $D_{s2m}$, as follows:

$$\mathcal{L} = \sum_{s \in \mathcal{D}_{s2m}} \sum_{k_i \in s} \sum_{-c \leq j \leq c, j \neq 0} \log \mathbb{P}(k_{i+j} | k_i), \quad (3)$$

where probability $\mathbb{P}(k_{i+j}|k_i)$ of observing a neighboring keyword $k_{i+j}$ given the current keyword $k_i$ is defined by a soft-max function (or normalized exponential):

$$\mathbb{P}(k_{i+j} | k_i) = \frac{\exp(v_{k_i}^T v'_{k_{i+j}})}{\sum_{k=1}^{K} \exp(v_{k_i}^T v'_k)}, \quad (4)$$

where $v_k$ and $v'_k$ are the input and output vector representations of keyword k; c is the length of the context in the search session and/or email content (from which the keyword was derived); and K is the number of unique words in the vocabulary. From equations (3) and (4), Step 454's vector analysis models the context of keyword sequences into low-dimensional vector representations, where keywords with similar contexts (e.g., with related keywords) will have similar vector representations. According to some embodiments, the steps performed in Step 454 (e.g., the computations occurring in equations (3) and (4)) can be performed by any known or to be known negative sampling algorithm or technique in order to reduce the computational complexity, which may be implemented when the vocabulary size of a dataset (or database) is above a threshold amount of vocabulary terms.

In Step 456, having determined the vector representations of the keywords in the joint dataset $D_{s2m}$, term-expansions for each keyword's vector representation can be determined. According to some embodiments, term-expansion for a vectorized keyword may only occur for keywords that exist in both the search and mail dataset—those keywords having the "b_" prefix applied within the joint dataset $D_{s2m}$. In some embodiments, term expansions may only occur for those keywords that exist in the mail dataset—those keywords denoted with a "m_" prefix.

According to some embodiments, the term-expansion applied to the terms of the joint database can involve any known or to be known series expansion algorithm or technique, such as, but not limited to, Taylor Series representation, Fourier series representation and the like. Thus, as understood by those of skill in the art, the term-expansion applied in Step 456 can involve determining a convergence of properties associated with each keyword thereby causing the identification of related keywords within the dataset (or from a database or lexicon of terms). According to some embodiments, cosine similarities between the term-expansion properties of each keyword are calculated in order to determine similarities between keywords in the joint dataset, as discussed below.

According to some embodiments, Step 456 involves making a first determination whether a search keyword belongs to a "s_" or "b_" keyword type. Next, the determination module 306 calculates cosine similarities to all other "b_*" and/or "m_" keywords in the dataset based on such keywords vectors (from Step 454). Based on such cosine calculations, similar keywords in the vector space are identified—for example, a list of K keywords is identified for expansion. In some embodiments, such keywords may be sorted based on their cosine similarity, where only those terms that satisfy a similarity threshold t (e.g., t=0.6) are identified for expansion.

By way of a non-limiting example, as illustrated in the below table, search keyword "weight loss", identified in joint dataset $D_{s2m}$ as "s_weight_loss" because such words were not found in the mail data set are expanded to be related to mail terms: "diet", "appetite suppressants", "b12 shots" and the like. Similarly, the search term "hiking" was determined to be related to, via the term-expansion discussed above, to the mail terms "mountain biking" and the like.

| Search keyword | Mail keywords |
|---|---|
| s_weight_loss | m_diet, m_appetite_suppressants, m_b12_shots, m_fat_burner, m_build_muscle, m_stop_believing, m_medically_supervised |
| s_hiking | m_mountain_biking, m_matthew_henson, m_biking_camping, m_camping_backpacking, m_hiking_enthusiasts, m_outdoor_adventurers |

Thus, as a result of Step 456, search and mail terms that are related to each other (e.g., those terms in the same category or referring to the same context of content) are identified in the joint dataset via the term-expansion process discussed above. As a result, as discussed in more detail below, when a search request for content is received, the request can be expanded to include those related terms discovered/determined from a mail dataset, such that the search is augmented with related mail terms.

Turning back to FIG. 4A, after the joint dataset is compiled, as in Step 406 discussed above, Step 408 involves receiving a request for content to communicate to a user. Step 408, and Steps 410-414 are performed by the media identification module 308.

According to some embodiments, the request can be based on any type of known or to be known process for triggering a request to serve or communicate content to a user, such as, for example, a user requesting content, a user browsing a particular web page and being determined to receive particular content based on such browsing, the user's location, the user's interests derived from his/her user profile, the user's mail activity, the user's search activity, the user's social networking activity, the users media rendering activity and the like. Step 408's request therefore comprises information related to the type of content that should be provided to the user, which is based on the activity of the user, as discussed above.

In Step 410, the information included in the search request is utilized as a search query respective to the joint dataset $D_{s2m}$. The search of the joint dataset $D_{s2m}$ results in identification of a set of keywords that are to be used to search a content repository for the requested content. The content repository can be associated with any type of content provider, including, but not limited to, a photo-sharing site, video streaming platform, social network, third party vendor, and the like.

By way of a non-limiting example, user Bob is browsing the internet on the website rei.com/hiking. A determination is made that Bob is interested in hiking apparel because he is viewing the hiking section from the online store REI® (an outdoors supplier). Thus, this determination results in a request being communicated to the joint dataset $D_{s2m}$ for keywords associated with "hiking." As illustrated in the above table, the hiking term is associated with (i.e., expanded) to correspond to, for example, "mountain biking", "biking", "camping", "backpacking". Thus, the information of the request results in identifying related keywords that can be used to serve user Bob content, as simply searching for hiking is limited to only that type of outdoors activity; however, augmenting the hiking term with the other terms derived from the term-expansion of the term hiking enables a more robust and relevant search for content, as discussed below.

In Step 412, the terms identified from Step 410 are utilized to search a content repository. As discussed above, this effectuates a higher quality search because the intent of the user can be honed by the inclusion of the discovered and related mail terms to the overall search, which produces more a impactful search query leading to a more relevant search result. In Step 414, the identified content from the search of Step 412 is identified and communicated to the user.

Continuing with the above non-limiting example, the initial search request for hiking has now been augmented with the terms "mountain biking", "biking", "camping" and "backpacking". These terms are then provided to a content database as search for content that most closely matches the augmented search query. The identified content is then retrieved and communicated to Bob. For example, in some embodiments, this can involve displaying the content on the REI web page Bob is currently viewing, and in some embodiments, this can involve sending Bob an email with the retrieved content within the body of the email.

In some embodiments, the content database can be a database of digital advertisements comprising digital ad content. Thus, as with the above example for user Bob, Bob can be provided a multi-media content item (or object) within the display REI web page which displays digital content corresponding to promotional content from REI or a competitor. It should also be understood that the multi-media content can be a digital representation of a product or service, such that the content and content information associated therewith, while displayed as a digital media item, relates to a product that can be purchased and/or rendered by the user (e.g., a commodity product such as a hiking boots or a downloadable program such as a trail guide application).

FIG. 5 is a work flow example 500 for serving relevant digital media content associated with advertisements (e.g., digital advertisement content) based on the information associated with the identified media (or content), as discussed above in relation to FIGS. 3-4B. Such information, referred to as "search information" for reference purposes only, can include, but is not limited to, analyzed information (i.e., search and/or mail information), the identity, context and/or type of media content being rendered and/or provided to a user, the content of such media, and the like, and/or some combination thereof.

As discussed herein, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises content relaying promotional content provided by a network associated third party.

By way of a non-limiting example, work flow 500 includes a user requesting and being provided a set of photographs related to Land Rover® Sports Utility Vehicles (SUVs) because the user has signed up for a email newsletter associated with those vehicles. Based on such information, the user may be provided with digital ad content related to special promotions provided by Land Rover® such as, for example, seasonal deals for leasing or purchasing particular Land Rover® models.

In Step 502, search information associated with a search session, mail session or joint search/mail session is identified. As discussed above, the search information can be based any of the information form search process outlined above with respect to FIGS. 3-4B. For purposes of this disclosure, Process 500 will refer to single provided/identified content object (e.g., text, keyword, served media file) as the basis for serving a digital advertisement(s); however, it should not be construed as limiting, as any number of search and/or mail sessions, identified content items, and/or quantities of information related to applications on a user device and/or media renderable via such applications can form such basis, without departing from the scope of the instant disclosure.

In Step 504, a context is determined based on the identified search information. This context forms a basis for serving advertisements related to the search information. In some embodiments, the context can be determined by determining a category which the search information of Step 502 represents. For example, the category can be related to the content type of the media being searched for, identified, selected or rendered. In some embodiments, the identification of the context from Step 504 can occur before, during and/or after the analysis detailed above with respect to Process 400, or some combination thereof.

In Step 506, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 508, the advertisement server 130 searches the ad database for a digital advertisement(s) that matches the identified context. In Step 510, an advertisement is selected (or retrieved) based on the results of Step 508. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to search for and/or render the media. Step 512. In some embodiments, the selected advertisement is sent directly to each user's computing device. In some embodiments, the selected advertisement is displayed in conjunction with the rendered and/or identified media on the user's device and/or within the application being used to search for and/or render the media.

As shown in FIG. 6, internal architecture 600 of a computing device(s), computing system, computing platform and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk interface 608 and/or media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces 622 not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing image and/or video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device, a request for content to communicate to a user, said request comprising information corresponding to online activity of the user;

searching, via the computing device, a keyword dataset for a search keyword based on said information, the keyword dataset generated by:

obtaining a search dataset comprising search keywords and a mail dataset comprising mail keywords, the search keywords associated with sessionized searches, the mail keywords associated with sessionized mail messages;

identifying a format of the mail keywords;

transforming the search keywords into the identified format of the mail keywords; and generating the keyword dataset by merging the transformed search dataset and the mail dataset, the generation of the keyword dataset further comprising tagging each keyword of the keyword dataset with an indication of being sourced from the search dataset, the mail dataset, or both, wherein related keywords sourced from the search dataset and the mail dataset are identified by automatically executing a term expansion algorithm on the tagged search keywords and the tagged mail keywords in a manner that indicates a relationship of relatedness between keywords sourced only from the search dataset and keywords sourced only from the mail dataset;

identifying, via the computing device, based on said searching using said information as a query, said search keyword, said identified search keyword associated with a previously entered search query;

analyzing, via the computing device, said search keyword, said analysis comprising identifying augmenting information to the search keyword indicating a source of the search keyword and a presence in said keyword dataset;

further searching, via the computing device, based on the identified search keyword, the keyword dataset;

identifying, via the computing device, based on said searching using said identified search keyword as a query, a mail keyword within the keyword dataset that corresponds to the identified search keyword, said mail keyword associated with a previously communicated email message;

analyzing, via the computing device, the mail keyword, said analysis comprising identifying augmenting information to the mail keyword corresponding to the previously communicated email message and a presence in said keyword dataset;

compiling, via the computing device, a computer-generated search query comprising a single keyword based on the identification of the augmenting information for the search keyword and mail keyword, said computer-generated search query being generated via word2vec modelling performed by the computing device;

searching, via the computing device over a network, for a content item based on said computer-generated search query;

identifying, via the computing device, said content item based on said computer-generated search; and communicating, via the computing device, said content item to a device of said user in response to said computer-generated search query and said request.

2. The method of claim 1, further comprising:
analyzing a database of search queries associated with a search platform, said analysis comprising determining a plurality of search keywords from said search queries; and
compiling the search dataset from said plurality of search keywords.

3. The method of claim 2, further comprising:
analyzing a database of mail messages associated with a mail platform, said analysis comprising determining a plurality of mail keywords from said mail messages; and
compiling the mail dataset from said plurality of mail keywords.

4. The method of claim 3, wherein said analysis of said search queries and said mail messages is based on word2vec modeling, wherein said search keywords and said mail keywords are based on determined word embeddings from said word2vec modeling.

5. The method of claim 3, further comprising:
analyzing said keyword dataset to identify keywords that were sourced from the search dataset and keywords that were sourced from the mail dataset; and
tagging each keyword based on the source of the keyword.

6. The method of claim 5, wherein a keyword sourced from both the search and mail dataset is tagged with an indication that the search and mail datasets comprise said keyword, wherein a keyword sourced from only the search dataset is tagged with an indication it is a search term, and wherein a keyword sourced from only the mail dataset is tagged with an indication it is a mail term.

7. The method of claim 5, further comprising:
determining a feature vector for each keyword in the keyword dataset; and
determining a term-expansion for each keyword, wherein said term expansion for each keyword comprises identifying a corresponding mail keyword to a search keyword in the keyword dataset based on said determined feature vectors.

8. The method of claim 7, wherein said determined term-expansion is only performed on vectors of keywords that appear in both the search and mail datasets.

9. The method of claim 7, wherein said determined term-expansion is only performed on vectors of keywords that appear in the mail dataset.

10. The method of claim 5, wherein said search keywords are treated as a single keyword as a result of said transformation.

11. The method of claim 1, wherein said request corresponds to a search request for content from said user, wherein said request comprises said search keyword.

12. The method of claim 1, further comprising:
determining, from said online activity of the user, a current website said user is viewing, wherein said request comprises information associated with said current website.

13. The method of claim 1, further comprising:
determining a context of the communicated content item;
causing communication, over the network, of said context to an advertisement platform to obtain a digital content file comprising digital advertisement content associated with said context; and
communicating said identified digital advertisement content file in association with said communication of said content item.

14. The method of claim 7, wherein said determination of the feature vectors is based on applied skip-gram (SG) modeling of the keywords in the keyword dataset.

15. A non-transitory computer-readable storage medium tangibly encoded with computer-executable instructions, that when executed by a processor associated with a computing device, performs a method comprising:
receiving a request for content to communicate to a user, said request comprising information corresponding to online activity of the user;
searching a keyword dataset for a search keyword based on said information, the keyword dataset generated by:
obtaining a search dataset comprising search keywords and a mail dataset comprising mail keywords, the search keywords associated with sessionized searches, the mail keywords associated with sessionized mail messages;
identifying a format of the mail keywords;
transforming the search keywords into the identified format of the mail keywords; and
generating the keyword dataset by merging the transformed search dataset and the mail dataset, the generation of the keyword dataset further comprising tagging each keyword of the keyword dataset with an indication of being sourced from the search dataset, the mail dataset, or both, wherein related keywords sourced from the search dataset and the mail dataset are identified by automatically executing a term expansion algorithm on the tagged search keywords and the tagged mail keywords in a manner that indicates a relationship of relatedness between keywords sourced only from the search dataset and keywords sourced only from the mail dataset;
identifying based on said searching using said information as a query, said search keyword, said identified search keyword associated with a previously entered search query;
analyzing, via the computing device, said search keyword, said analysis comprising identifying augmenting information to the search keyword indicating a source of the search keyword and a presence in said keyword dataset;
further searching, based on the identified search keyword, the keyword dataset;
identifying, based on said searching using said identified search keyword as a query, a mail keyword within the keyword dataset that corresponds to the identified search keyword, said mail keyword associated with a previously communicated email message;
analyzing, via the computing device, the mail keyword, said analysis comprising identifying augmenting information to the mail keyword corresponding to the previously communicated email message and a presence in said keyword dataset;

compiling, via the computing device, a computer-generated search query comprising a single keyword based on the identification of the augmenting information for the search keyword and mail keyword, said computer-generated search query being generated via word2vec modelling performed by the computing device;

searching, over a network, for a content item based on said computer-generated search query;

identifying said content item based on said computer-generated search; and communicating said content item to a device of said user in response to said computer-generated search query and request.

16. The non-transitory computer-readable storage medium of claim 15, further comprising:

analyzing a database of search queries associated with a search platform, said analysis comprising determining a plurality of search keywords from said search queries; and compiling the search dataset from said plurality of search keywords.

17. The non-transitory computer-readable storage medium of claim 16, further comprising:

analyzing a database of mail messages associated with a mail platform, said analysis comprising determining a plurality of mail keywords from said mail messages; and compiling the mail dataset from said plurality of mail keywords.

18. The non-transitory computer-readable storage medium of claim 17, wherein said analysis of said search queries and said mail messages is based on word2vec modeling, wherein said search keywords and said mail keywords are based on determined word embeddings from said word2vec modeling.

19. The non-transitory computer-readable storage medium of claim 17, further comprising:

analyzing said keyword dataset to identify keywords that were sourced from the search dataset and keywords that were sourced from the mail dataset; and tagging each keyword based on the source of the keyword.

20. The non-transitory computer-readable storage medium of claim 19, further comprising:

determining a feature vector for each keyword in the keyword dataset; and determining a term-expansion for each keyword, wherein said term expansion for each keyword comprises identifying a corresponding mail keyword to a search keyword in the keyword dataset based on said determined feature vectors.

21. A computing device comprising:

a processor; and a non-transitory computer-readable storage medium for tangibly storing thereon program logic for execution by the processor, the program logic comprising:

logic executed by the processor for receiving a request for content to communicate to a user, said request comprising information corresponding to online activity of the user;

logic executed by the processor for searching a keyword dataset for a search keyword based on said information, the keyword dataset generated by:

obtaining a search dataset comprising search keywords and a mail dataset comprising mail keywords, the search keywords associated with sessionized searches, the mail keywords associated with sessionized mail messages;

identifying a format of the mail keywords;

transforming the search keywords into the identified format of the mail keywords; and generating the keyword dataset by merging the transformed search dataset and the mail dataset, the generation of the keyword dataset further comprising tagging each keyword of the keyword dataset with an indication of being sourced from the search dataset, the mail dataset, or both, wherein related keywords sourced from the search dataset and the mail dataset are identified by automatically executing a term expansion algorithm on the tagged search keywords and the tagged mail keywords in a manner that indicates a relationship of relatedness between keywords sourced only from the search dataset and keywords sourced only from the mail dataset;

logic executed by the processor for identifying based on said searching using said information as a query, said search keyword, said identified search keyword associated with a previously entered search query;

logic executed by the processor for analyzing, via the computing device, said search keyword, said analysis comprising identifying augmenting information to the search keyword indicating a source of the search keyword and a presence in said keyword dataset;

logic executed by the processor for further searching, based on the identified search keyword, the keyword dataset;

logic executed by the processor for identifying, based on said searching using said identified search keyword as a query, a mail keyword within the keyword dataset that corresponds to the identified search keyword, said mail keyword associated with a previously communicated email message;

logic executed by the processor for analyzing, via the computing device, the mail keyword, said analysis comprising identifying augmenting information to the mail keyword corresponding to the previously communicated email message and a presence in said keyword dataset;

logic executed by the processor for compiling a computer-generated search query comprising a single keyword based on the identification of the augmenting information for the search keyword and mail keyword, said computer-generated search query being generated via word2vec modelling performed by the computing device;

logic executed by the processor for searching, over a network, for a content item based on said computer-generated search query;

logic executed by the processor for identifying said content item based on said computer-generated search; and logic executed by the processor for communicating said content item to a device of said user in response to said computer-generated search query and said request.

* * * * *